(12) United States Patent
Grasso et al.

(10) Patent No.: US 6,509,710 B2
(45) Date of Patent: Jan. 21, 2003

(54) METHOD AND SYSTEM FOR DRIVING SWITCHED RELUCTANCE MOTORS (SRM)

(75) Inventors: Giuseppe Grasso, S.G. la Punta; Giovanni Zichella, Misterbianco, both of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/866,534

(22) Filed: May 25, 2001

(65) Prior Publication Data

US 2002/0021103 A1 Feb. 21, 2002

(30) Foreign Application Priority Data

May 26, 2000 (EP) .............................................. 00830379

(51) Int. Cl.[7] .............................. H02P 7/36; H02P 1/46; H02P 3/18; H02P 5/28
(52) U.S. Cl. ........................ 318/701; 318/254; 318/721
(58) Field of Search ................................. 318/254, 439, 318/606–608, 700–701, 705, 721, 807, 809

(56) References Cited

U.S. PATENT DOCUMENTS

| 4,086,471 A | | 4/1978 | Takahashi ............. 235/92 DM |
| 4,739,240 A | | 4/1988 | MacMinn et al. .......... 318/696 |
| 5,168,202 A | * | 12/1992 | Bradshaw et al. .......... 318/608 |
| 5,589,746 A | | 12/1996 | Lewis ....................... 318/439 |
| 5,637,974 A | | 6/1997 | McCann ..................... 318/701 |
| 5,677,607 A | * | 10/1997 | Sugiyama et al. .......... 318/439 |
| 5,793,179 A | | 8/1998 | Watkins ..................... 318/701 |
| 5,923,141 A | * | 7/1999 | McHugh ..................... 318/254 |
| 5,942,865 A | | 8/1999 | Kim ........................... 318/254 |
| 5,977,740 A | | 11/1999 | McCann ..................... 318/701 |
| 6,285,148 B1 | * | 9/2001 | Sugiyama ................... 318/254 |
| 6,366,048 B2 | * | 4/2002 | Greif ......................... 318/254 |

FOREIGN PATENT DOCUMENTS

| EP | 0 774 828 A1 | 5/1997 |
| EP | 0 800 263 A1 | 10/1997 |
| EP | 0 802 622 A | 8/1998 |

* cited by examiner

Primary Examiner—Marlon Fletcher
(74) Attorney, Agent, or Firm—Lisa K. Jorgenson; Robert Iannucci; Seed Intellectual Property Law Group PLLC

(57) ABSTRACT

A Switched Reluctance Motor or SRM is controlled by detecting signals indicating the angular position of the rotor of the motor and energizing the motor depending on these signals. The periods of the abovementioned signals are discretized into a given number of time windows, defining a table with a plurality of positions each corresponding to one of said time windows. A respective power supply configuration of the motor is associated with each of said positions of the table. The positions in the table undergo cyclical scanning and the motor is energized with the power supply configuration associated with the position identified in each case during the scanning movement. The scanning movement is performed from a reference position identifying the energization advance of the motor and preferably determined using a logic of the fuzzy type based on the speed of rotation and the load of the said motor.

17 Claims, 6 Drawing Sheets

METHOD AND SYSTEM FOR DRIVING SWITCHED RELUCTANCE MOTORS (SRM)

TECHNICAL FIELD

The present invention relates to the driving of motors commonly referred to as "SRM", an abbreviation for Switched Reluctance Motor.

BACKGROUND OF THE INVENTION

A motor of this type may essentially be regarded as a stepper motor in which the rotor and the stator are in the form of salient poles. Unlike a conventional stepper motor, however, an SRM has a rotor which does not possess the permanent magnets necessary for creating the magnetic rotor flux and the rotor essentially consists of a stack of iron laminations. Owing to this particular feature, the SRM is generally classified as a single-flux synchronous motor. Moreover, owing to the geometry of the stator and rotor pack, the reluctance of the magnetic circuit which is formed depends, at each instant, on the position of the rotor and the phase energized.

This results in a periodic modulation effect of the inductance of each stator winding which is reflected in the problem of polarization of a variable inductance.

The conventional techniques used for the driving of SRMs envisage the sequential energization of the stator phases in synchronism with the current position of the rotor. It is therefore of fundamental importance to know the position of the rotor. Although a large number of solutions which do not use sensors are mentioned in literature on the subject, the most common commercial solution remains hitherto that which envisages reading of the rotor position by means of optical or Hall-effect sensors keyed onto the rotor.

Owing to the information supplied by the sensors it is relatively simple to construct the phase energization sequence to be sent to the power switches which connect the stator windings to the continuous power supply of the power stage.

The exact knowledge of the positions in which the inductance has its minimum value allows the corresponding phase to be energized with a rapidly increasing current (when the winding is excited by a voltage generator), while knowledge of the points where the inductance has its maximum value allows the braking effect associated with the generation of negative torques to be avoided.

Consequently, the degree of efficiency of an SRM is closely associated with the capacity of the associated driving unit to provide phase currents which as far as possible have a rectangular waveform, i.e. have leading and trailing edges which are ideally vertical so as to be able to energize and de-energize the associated phase in as short a time as possible.

FIGS. 1 and 2 of the accompanying drawings illustrate the typical procedures for driving an SRM in conditions of low speed of rotation (FIG. 1) and high speed of rotation (FIG. 2).

In particular, in both the figures, the uppermost diagram, indicated by a), illustrates the trend of the ideal inductance L.

In FIG. 1, the two lower diagrams, indicated by b1) and b2), illustrate respectively the ideal trend and the actual trend of the current I in conditions of low speed of rotation. Similarly, the diagram b) in FIG. 2 illustrates the actual trend of the current in high-speed driving conditions.

Finally, the two diagrams indicated by c) illustrate the trend of the voltage V to be applied, again with reference, respectively, to the low-speed and high-speed driving conditions.

Observing FIGS. 1 and 2 it can be understood that the electrical and mechanical time constants of the motor impose limits on the rising and falling speed of the current when the phase is energized using a constant-voltage generator. These time constants of the motor give rise to a phase energization delay or, in other words, conditions such that the winding current reaches its mean value with a rising time which is excessively long.

In particular, at high speeds, the electrical time constant $L/R$ becomes comparable to the energization time Ton of the phase: since the phase must be de-energized even before the current has reached its rated value, it therefore becomes impossible to reach the desired mean current value (and therefore the desired torque level).

Substantially similar problems exist for middle-range speeds and high loads for which equally high mean currents are required.

In an attempt to avert these negative phenomena, the solution of introducing an advance in energization of the phase to be polarized is known in the art. In other words, with this solution, current starts to be injected a short time before the minimum inductance value of the phase. This is performed in order to reach the appropriate current level during the positive-torque inductance zone.

Introduction of an energization advance in principle may be achieved by displacing the position sensors a few mechanical degrees forwards or backwards (in the opposite direction to the direction of rotation of the rotor). However, with the sensors keyed onto the rotor in a permanent manner it is possible to achieve an optimum result only for a predefined and single advance value. The result is that an optimum current waveform is obtained only for predefined speeds, with a decrease in efficiency for the whole of the remainder of the motor-speed range.

Various solutions have been proposed, which solutions, based on the information supplied by the sensors, calculate the optimum energization instants so as to provide different advances for the various speeds of the rotor and the different load conditions.

These solutions, however, encounter problems associated with computational difficulties. The option of limiting the complexity of the calculation relating to the advance value results in an excessively simple operation which is therefore less than optimal. If a more refined solution is required, machine-calculated equations must be used, resulting in the need to use high performance microcontrollers (which are therefore costly) or DSPs.

For example, the patent U.S. Pat. No. 5,977,740 discloses a control system which energizes in a selective manner the winding of a motor so as to maximize the efficiency and the output torque, taking into account possible variations in the speed of the rotor, the temperature of the windings and the power supply voltage. More specifically, this document describes a vehicle equipped with a motor in which the advance is controlled in order to brake the vehicle. Control of the advance is performed using a DSP and complex mathematical calculations.

U.S. Pat. No. 5,942,865 describes a solution in which the advance of a motor is controlled by means of analog circuitry. Besides the constructional complexity, this solution has the drawback that the advance may be set only manually using potentiometers.

SUMMARY OF THE INVENTION

An embodiment of the present invention provides a solution for the control of motors of the SRM type which is able to reconcile the need for low-cost and easily implemented solutions (for example using an 8-bit microcontroller) with the need for a sophisticated driving diagram (preferably using fuzzy-type logic systems).

Essentially, the invention proposes a solution providing an alternative to solutions which involve calculation of the phase energization instants. This is performed in a preferred manner by means of characterization of the advance values using fuzzy-logic models.

In particular, a solution according to the invention allows control of the necessary phase energization advance in relation to the speed and load conditions of the motor. A solution according to the invention may be implemented in a particularly advantageous manner in three-phase motors which can be used, for example, in electric household appliances.

In any case, a solution according to the invention is applicable to any number of phases and may be used in widely varying areas of application.

In a preferred manner, a solution according to the invention is based on the use of fuzzy-type logic in order to provide an expert system capable of maximizing the electromechanical efficiency of the motor at every working point in the system.

Owing to this expert system, it is possible to optimize the energy consumption and the maximum torque which can be output by the said motor over the whole operating speed range of the motor. It is also possible to create a control loop for the speed and/or the output torque so as to provide a solution where the performance/cost ratio of the system is competitive compared to solutions based on the use of motors of the traditional type.

BRIEF DESCRIPTION OF THE DRAWINGS

The invention will now be described, purely by way of a non-limiting example, with reference to the accompanying drawings in which.

DETAILED DESCRIPTION OF THE DRAWINGS

An embodiment according to the invention is based on three main factors, namely: temporal discretization of the period of the signals supplied by the sensors which detect the position of the motor rotor, consequent scanning of this period and control of the power switches which energize the motor phases in accordance with the results of the above-mentioned operations.

In particular, by analyzing the temporal relation between the information supplied by the sensors and the phase energization sequence, it is possible to isolate the minimum periodicity of the signals and discretize it into time windows or slots of the desired magnitude. The energization commands contained in each slot are memorized in the rows of a sequential-address look-up table. The sequential scanning of the table provides at its output the same original timing, provided that the scanning speed is correlated with the information supplied by at least one sensor.

Figure 1:
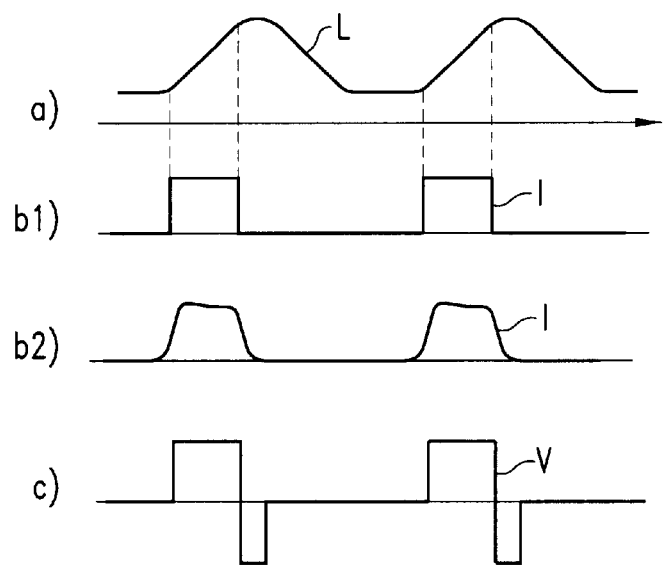
FIGS. 1 and 2 have already been described above in order to illustrate the problems associated with the driving of SRMs.
Figure 2:
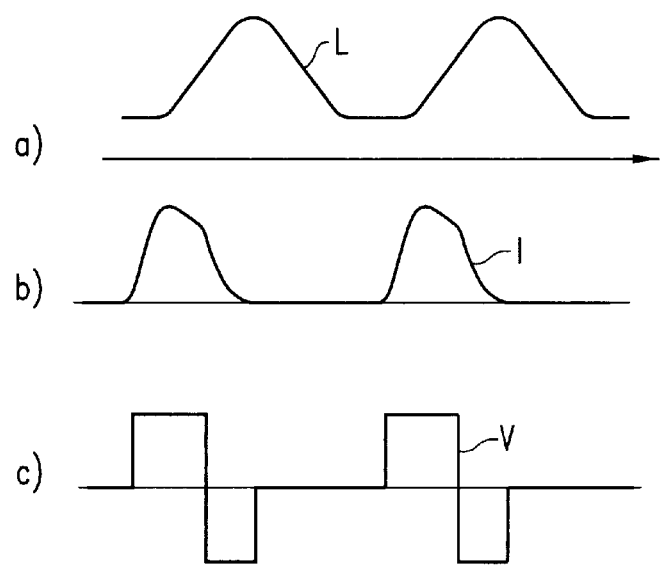
Figure 3:
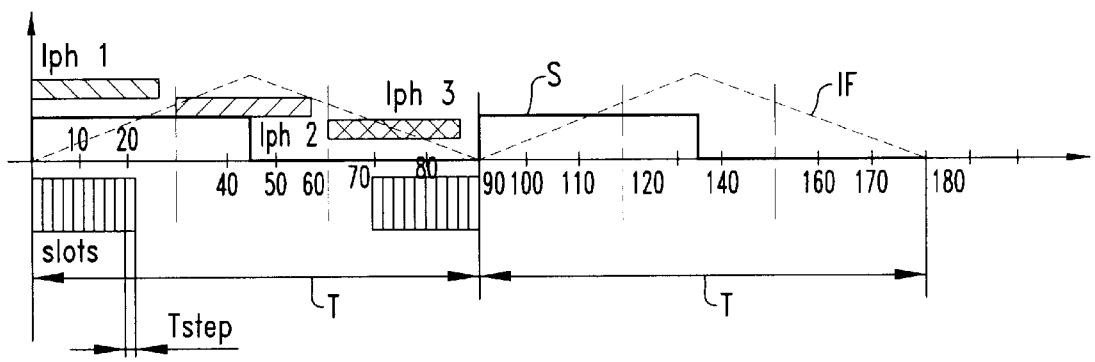
FIG. 3 illustrates the basic criteria applied for processing a signal produced by a sensor within a system according to the invention.

FIG. 3 shows the typical progression of the signal S supplied by a sensor which detects the position of the rotor of an SRM. For immediate reference purposes, the signal S is shown in contrast with the ideal progression, in broken lines, of the phase inductance IF.

With reference to the diagram in FIG. 8 (referred to in greater detail below), the motor being driven is indicated by 10 and the position sensors of the rotor are indicated collectively by the reference number 12.

By way of example, it is possible to conceive of the motor 10 being a three-phase SRM (6/4 poles) with one or more associated sensors 12 by means of which it is possible to obtain, for each sensor, four square waves for each rotation of the motor. In this case, a quarter of a rotation (or 90 mechanical degrees) corresponds to the single period T of a sensor. With this solution, within the 90 degrees it is necessary to excite all three phases sequentially. The diagram according to FIG. 3 relates to a solution where the phases have been excited individually, as represented by the differently hatched rectangles indicated by the references Iph1, Iph2 and Iph3, respectively.

Below the axis of the abscissa in FIG. 3 a general number N of time windows or slots (ranging from 0 to N−1), into which the period T of the signal S has been subdivided, is shown. The number N may be chosen as required, in accordance with the desired resolution of the advance. For example, N=90 may be chosen so as to ensure that each interval corresponds in practice to one degree of rotation of the motor.

Figure 4:
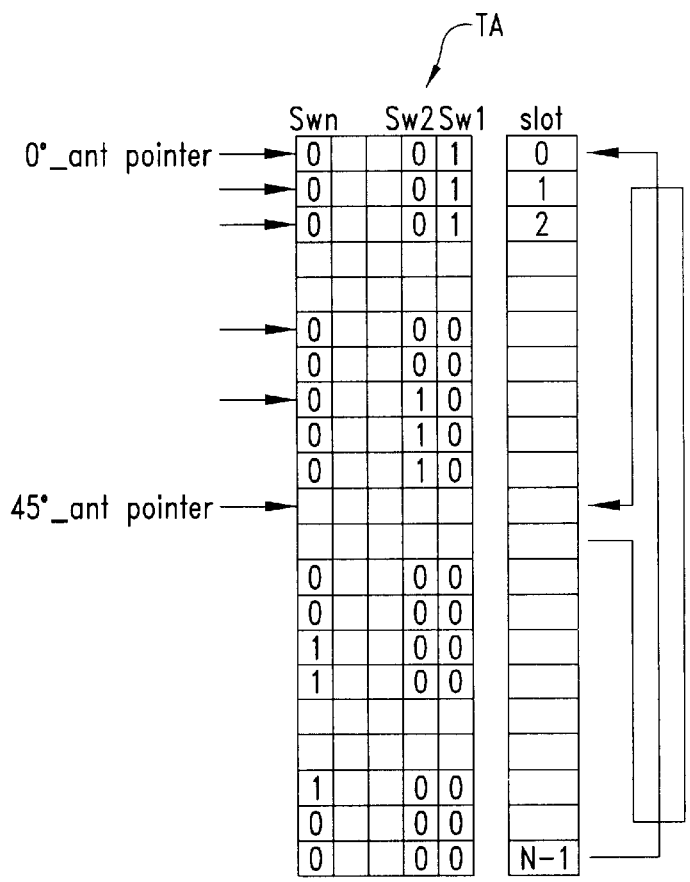
FIG. 4 shows the layout of a corresponding look-up table.

The table TA shown in FIG. 4 is therefore organized in a corresponding number of rows (in the case in question 90 rows—see the column furthest to the right indicated by "slot"), with each row intended to be scanned for a time interval corresponding to a degree of rotation of the rotor. It is obvious, moreover, that the duration of this interval depends on the speed of the rotor. Each row in the table according to FIG. 4 contains, for each column, the logic value of the command to be sent to a corresponding switch Sw1, Sw2, . . . , Swn for energization of the motor phases. Thus, as will be more fully described below, these switches are included in the block 13 in FIG. 8.

Scanning of the table constitutes a very important feature of an embodiment of the invention. The scanning period should be an exact submultiple (equal to N) of the period generated by the sensor in the preceding sector. In so doing, the output sequence generated by means of the table TA has an overall duration equal to the period of the sensor (in the example equal to T). In a complementary manner, in terms of frequency, if the output frequency of the sensor is Fs, the scanning frequency of the table must be N*Fs.

The problem may therefore be expressed in terms of the digital measurement of the period/frequency of the sensor.

Figure 5:
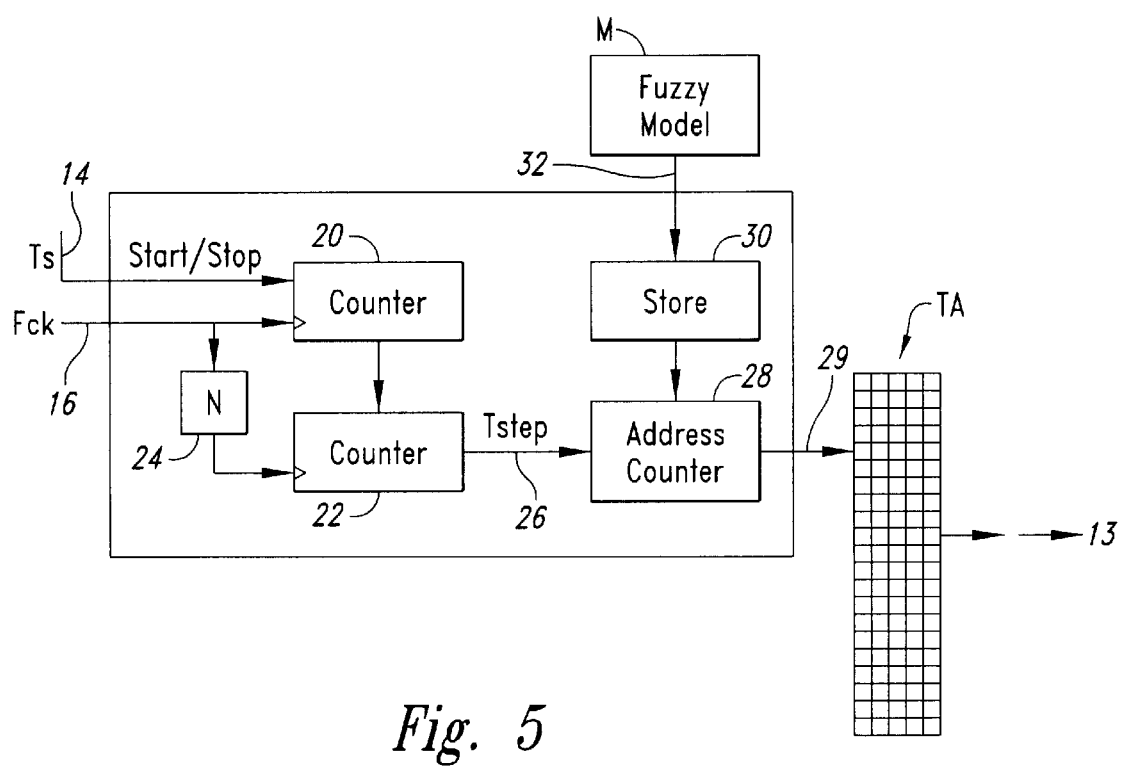
FIG. 5 shows the block diagram of a digital frequency multiplier which can be used within the context of the invention.

In the mode of implementation proposed, the period of the signal S of the sensor (measured, for example, using a 16-bit counter) is provided as a signal Ts on the line 14 of FIG. 5. On another line 16 however, a frequency clock signal Fck generated by a respective clock (not shown) is present.

In the block diagram according to FIG. 5, the reference number 20 indicates a 16-bit counter with respect to which the signal Ts acts as a start/stop signal counting the clock signal present on the line 16.

The digital value obtained by the counter 20 is used for parallel loading of another counter 22 also consisting preferably of another 16-bit counter. The clock frequency of the counter 22 is, however, N times greater, being obtained from the clock signal present on the line 16 by means of a multiplier by N, indicated by 24.

The end-of-count signal Tstep of the counter 22 is sent on the line 26 to an address counter 28 which acts as a pointer in the table T.

The reference number 30 indicates a module which provides the counter 28 with a suitable offset depending on a target advance (target pre-phase) value provided on the line 32 from a module M further described below.

Figure 6:
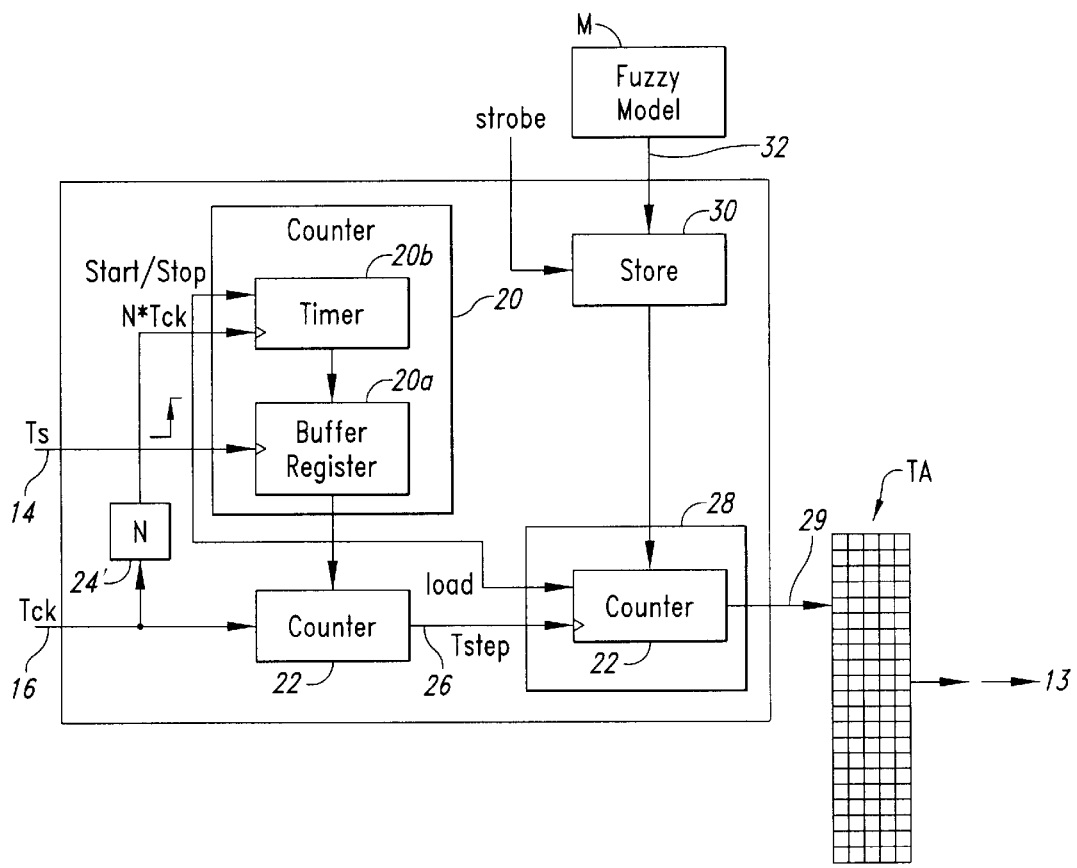
FIG. 6 shows the same diagram according to FIG. 5, implemented by means of a VHDL description.

FIG. 6 shows the internal architecture of the functional blocks shown in FIG. 5. With reference to the blocks in FIG. 6, the translation into VHDL language envisages the use of 16-bit variables which are synthesized as counters.

In particular, the diagram according to FIG. 6 envisages that the period Ts of the signal S present on the line 14 is measured with a sampling time Tck (for example with a value of 50 microseconds). This resolution allows reading of periods in a very wide range and may be varied depending on the characteristics of the motor. At the end of each count, the value read is stored in a buffer register 20a, while a timer 20b performs subsequent measurement.

Since in FIG. 6 the signal present on the line 16 is regarded as a period signal Tck, the action of multiplication by N has been shown here in dual mode compared to the mode shown in FIG. 5. In the diagram according to FIG. 6 there is, in fact, a multiplier block 24' which multiplies by N the period of the driving signal of the counter 22 in view of the use of a signal which has a period n times greater (therefore with a lower frequency N) for driving the timer 20b included in the period measurement block 20.

Similarly, the digital value obtained in the buffer 20a is used to load the counter 22—in the form of a decremental counter-with a module which is the same as the first module, but which counts with a frequency N times greater. This greater speed causes resetting of the counter 22 in a relatively short time. Once the value 0 is reached, the counter 22 produces an end-of-count pulse forming precisely the signal Tstep present on the line 26 and, at the same time, it is reloaded with the same previous value supplied by the buffer 20a.

This therefore results in N counter-reloading operations (and N Tstep pulses) before the next period of the sensor is read. Considering that a large difference exists between two successive periods of the sensor, a time division with excellent resolution is thus obtained.

The signal Tstep is used in block 28 to synchronize the increment in the pointing variable which scans the table TA, normally realized in the form of a ROM.

With regard to that stated above, the digital value output by the block 20 assumes all the values from 0 to N−1 within a period of the sensor and therefore the table is entirely covered in the same time. Essentially, if the sensor period has been subdivided into 90 one-degree slots (as in a three-phase motor with three sensors), a table with 90 rows is obtained. 90 Tstep pulses and a counter in the block 28 which cyclically counts from 0 to 89 are thus needed in order to scan the table completely so as to reconstruct the theoretical energization timing.

At this point, the phase energization advance is simply converted into the offset value provided to the block 30 on the line 32 so as to be able to be added, in the block 28, to the value used for pointing in the table TA. The block 30 stores the desired energization advance value and supplies it to the block controlling the table pointer. Therefore, in the case of the advance being other than 0, the table TA is scanned from the location corresponding to the desired advance.

For example, FIG. 4 shows schematically, in the form of arrows which point to successive rows in the table TA, various possible advance positions between the value 0° ($0°_{13}$ ant pointer) and the value 45° ($45°_{13}$ ant pointer).

In the case where an advance of 45° is specified, the pointer is initialized in the middle of the table from arrival of the edge of Ts and then incremented by each pulse Tstep. After 90 Tstep pulses, the pointer is again situated at the midway point of the table for the next cycle (a quarter of a rotation by the rotor).

Figure 8:
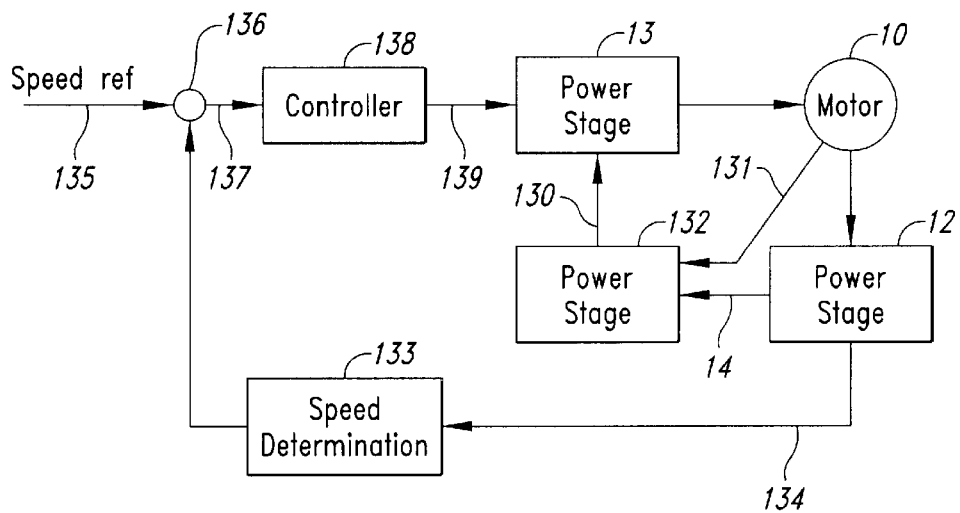
FIG. 8 shows a block diagram for speed control of a variable reluctance motor provided in accordance with the invention.

In a manner known per se, the phase energization function of the motor 10 is assigned to controlled power switches which are included, with regard to the diagram according to FIG. 8, in the block 13 and are individually identifiable as Sw1, Sw2, Swn. These are the same identification codes assigned to each of the vertical columns in the left-hand part of table T shown in FIG. 4. In this part of the table, the presence of a "0" indicates that the respective power switch is deactivated, while the presence, in the table, of the value "1" indicates activation or energization of the corresponding switch.

Usually, the different topologies used for the power stage 13 require flexibility of the control signals of the corresponding power switches, usually consisting of transistors. With the solution illustrated here it is possible to assign a column in the table TA to each transistor Sw1, Sw2, . . . , Swn of the power stage 13 so as to obtain independent control of its energization.

For example, in the case of a four-phase motor, the most frequently used topology envisages four phase energization switches which are positioned at the bottom of the bridge and four for performing the function of chopping of the phase current, positioned at the top of the bridge. In this case, the table TA is constructed as a memory with 8-type parallel arrangement.

In practice (see in particular the block diagram in FIG. 7), it is possible to have converging into a multiplexer 31, from the memory TA, respective output lines of the table TA, each of which is intended to drive a corresponding switch Sw1, Sw2, . . . , Swn included in the stage 13.

A typical problem of SRMs is associated with the presence of the multiplexer 31. Although many position sensors may be fitted, when the rotor is at a standstill, at the moment of start-up it is not possible to know which will be the initial direction of rotation as soon as the appropriate phase is energized.

For this purpose, a start-up routine, which starts the rotor moving in the desired direction, is frequently incorporated in the microcontrollers which control the entire system.

The multiplexer 31 basically forms a kind of block for bypassing the peripheral unit intended to allow direct control of the switches of the stage 13 by the microcontroller via corresponding lines µC_1, µC_2, ..., µC_n. The multiplexer is controlled by means of a line 310 so as to ensure that the switches 13 may be initially controlled, during start-up, by the signals supplied by the microcontroller (or by other external circuitry such as a cabled logic, manual commands, etc.). When the rotor has reached the desired speed, the operating condition is then switched to that in which control of the switches in the stage 13 is assigned to the signals obtained from the table TA.

Figure 7:
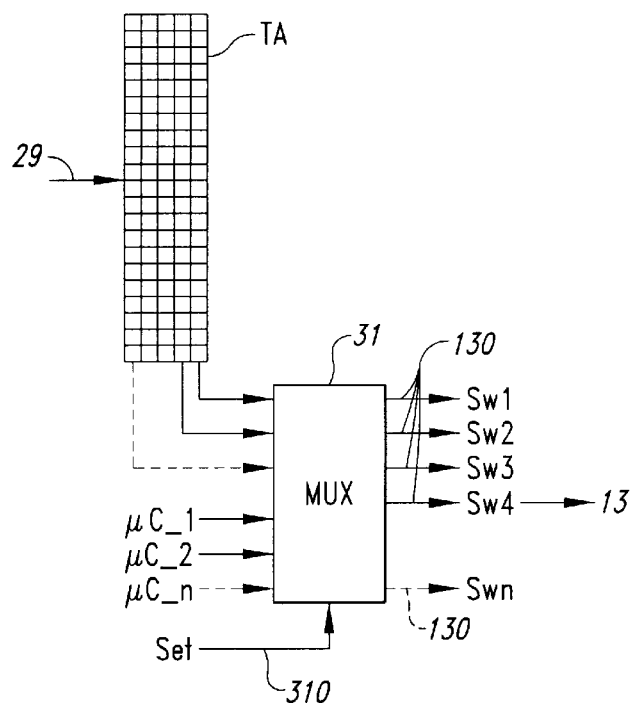
FIG. 7 shows the block diagram of the output multiplexer of the table according to FIG. 4.

In the block diagram according to FIGS. 7 and 8, the lines driving the stage 13 are denoted collectively by the reference number 130. In FIG. 8 the reference number 131 denotes a line on which there is present a current signal received from the motor 10 and used for operations involving regulation of the advance phase, performed in the block 132, which obviously incorporates also the various elements shown in FIGS. 5 and 6.

Again with reference to the same FIG. 8, the reference number 133 indicates a block which receives, on the line 134, the output signal of at least one of the sensors of the block 12 so as to allow determination of the speed of rotation of the motor.

The item of data relating to the speed of rotation of the motor is used in a feedback control loop intended to allow a reference speed defined on an input line 135 to be maintained by the motor 10.

In accordance with criteria which are widely known per se, a difference node 136 generates, on the basis of the reference value present on the line 135 and the feedback value supplied by the block 133, a speed deviation or error signal which, supplied on a line 137 to a control block 138, allows this block to generate on a respective output line 139 a corresponding control signal (typically associated, for example, with the operating angle of the switches included in the block 13).

Preferably, the set of elements represented by the blocks 132, 133 and 138 may be realized using an 8-bit microcontroller with a fuzzy-calculation capacity combined with a programmable logic.

Such a system may be used, for example, for the control of a three-phase variable reluctance motor with six stator poles and four rotor poles. A possible speed range which may be obtained varies from 100 to 20,000 revolutions per minute, while the energization advance may vary from 0 to 45 degrees.

Preferably, both the block 132 and the block 138 envisage the use of fuzzy-type logic systems.

In particular, the controller 138 may be advantageously constructed in the form of a PID (Proportional, Integral, Derivative) control system of the fuzzy type.

Also as regards the part of the block 132 which determines the advance value depending on the speed and the load applied to the motor, namely the module M in FIGS. 5 and 6, it is advantageous to use a model of the fuzzy type.

Since the performance of the motor and its torque characteristics are closely dependent upon the energization advance of each phase, it is of fundamental importance to provide the correct advance value at each speed and for each load condition. The use of a fuzzy model, constructed on the basis of experimental data measured on the motor under examination, allows the desired degree of accuracy to be obtained.

The use of a fuzzy model ensures, in particular as regards precision, results which are far better than those of alternative solutions such as, for example, mapping and interpolation of the data from a look-up table.

Figure 9:
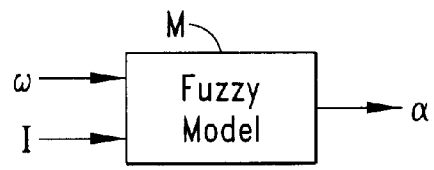
FIGS. 9 and 10 illustrate fuzzy model which can be used to generate the advance in the solution according to the invention.
Figure 10:
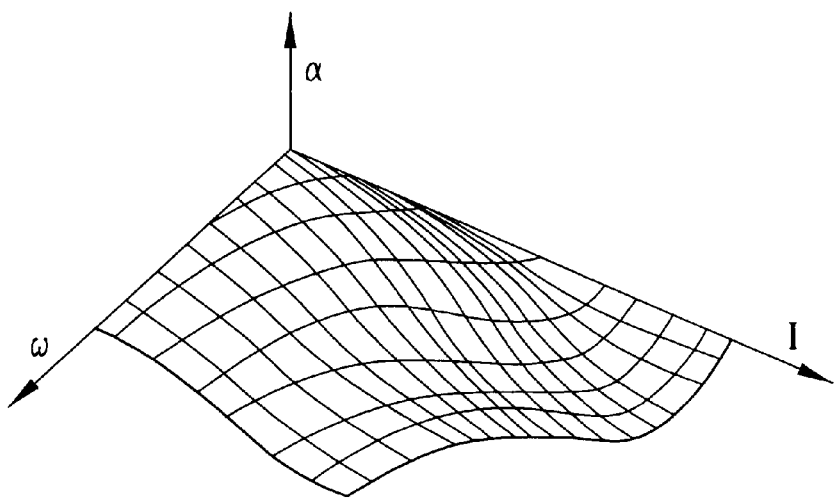

FIGS. 9 and 10 illustrate in schematic form the implementation, in the module M, of the abovementioned fuzzy model obtained by means of algorithms of the neural type with network learning relating to the data measured on the motor.

The fuzzy model is schematically shown in FIG. 9, where it can be seen that the module M is able to obtain the optimum advance value α depending on the speed of rotation (represented here as the pulse ω) and the current value I (indicating the load of the motor).

FIG. 10 shows the fuzzy correlation between the input variables ω and I and the output variable α.

Obviously, without departing from the principle of the invention, the constructional details and the embodiments may be widely varied with respect to that described and illustrated, without thereby departing from the scope of the present invention, as defined by the accompanying claims. This applies, in particular, to the possibility of realizing the system described both as a programmable logic and—in a currently preferred embodiment of the invention—entirely on silicon.

What is claimed is:

1. A method for controlling a Switched Reluctance Motor or SRM, comprising the operations of:
    detecting signals indicating an angular position of a rotor of the motor, said signals having given periods;
    energizing the motor depending on said signals;
    discretizing the periods of said signals into a given number of time windows;
    defining a table with a plurality of positions, each corresponding to one of said time windows;
    associating with each of said positions of the table (TA) a respective configuration for energization of the motor; and
    cyclically scanning the positions of said table and energizing the motor with the configuration associated with each of the position identified during the scanning movement.

2. The method according to claim 1, wherein the positions of said table are scanned with a frequency constituting a multiple of a frequency corresponding to one of said given periods of said signals.

3. The method according to claim 1 further comprising the operation of scanning sequentially said table from a reference position selectively variable depending on operating conditions of the motor.

4. The method according to claim 3, wherein said reference position is determined based on a parameter chosen from the group consisting of the speed of rotation and the load of the motor.

5. The method according to claim 3, further comprising the operation of determining said reference position using fuzzy logic.

6. The method according to claim 1, further comprising the operation of energizing the motor, by way of alternative, using the configuration associated with the position identified during the scanning of said table and using a selectively predetermined power supply configuration in order to impart to the motor a given direction of rotation.

7. A system for controlling a Switched Reluctance Motor or SRM using signals indicating an angular position of a rotor of the motor, said signals having given periods, the motor being associated with a power supply module which can be activated depending on said signals, the system comprising:

a discretization unit for discretizing the periods of said signals into a given number of time windows, a table with a plurality of positions each corresponding to one of said time windows and being associated with a respective configuration for energization of the motor, and a scanning module for cyclically scanning the positions of said table, identifying respective positions in the table for a plurality of successive cases, and activating said power supply module using the power supply configuration associated with the position identified in each case by said scanning module within said table.

8. The system according to claim 7, wherein said scanning module is structured to scan said table with a frequency forming a multiple of the frequency identified by the given periods of said signals.

9. The system according to claim 8, wherein said discretization unit comprises a first counter which receives said signal identifying the angular position of the motor rotor and a second counter driven by said first counter; said second counter having a counting frequency forming a multiple of a counting frequency of said first counter.

10. The system according to claim 7 wherein said scanning module is instructed to sequentially scan said table from a reference position selectively variable depending on operating conditions of the motor.

11. The system according to claim 10, further comprising a unit for determining said reference position depending on at least one parameter chosen from a group consisting of the speed of rotation and the load of the motor.

12. The system according to claim 11, wherein said unit for determining the reference position operates using a fuzzy logic.

13. The system according to claim 7, further comprising a selection unit which is associated with said power supply module of the motor and can be selectively switched between a first operating condition, where said power supply module is activated in accordance with configurations associated with the positions of said table, and at least one second operating condition, where said power supply module is activated with selectively predetermined power supply configurations so as to impart to the motor a given direction of rotation.

14. The system according to claim 7 wherein said table is constructed in the form of a read-only memory.

15. The system according to claim 7, further comprising a control loop that regulates said power supply module of the motor depending on a speed signal derived from said position signals of the rotor so as to keep the speed of rotation of the motor at a given reference value.

16. The system according to claim 15, wherein said control loop comprises a fuzzy module.

17. The system according to claim 7, realized entirely with silicon.

* * * * *